(12) United States Patent
Hsieh et al.

(10) Patent No.: US 9,817,629 B2
(45) Date of Patent: Nov. 14, 2017

(54) AUDIO SYNCHRONIZATION METHOD FOR BLUETOOTH SPEAKERS

(71) Applicant: AIROHA TECHNOLOGY CORP., Hsinchu (TW)

(72) Inventors: Kuen-Rong Hsieh, Hsinchu (TW); I-Feng Su, Hsinchu (TW); Jhang-Liang Lin, Hsinchu (TW); Sheng-Yo Chiu, Hsinchu (TW)

(73) Assignee: Airoha Technology Corp., Hsinchu (TW)

( * ) Notice: Subject to any disclaimer, the term of this patent is extended or adjusted under 35 U.S.C. 154(b) by 0 days.

(21) Appl. No.: 14/589,119

(22) Filed: Jan. 5, 2015

(65) Prior Publication Data
US 2016/0098244 A1    Apr. 7, 2016

(30) Foreign Application Priority Data

Oct. 3, 2014   (TW) .............. 103134590 A

(51) Int. Cl.
| | |
|---|---|
| *G06F 17/00* | (2006.01) |
| *G06F 3/16* | (2006.01) |
| *H04W 4/00* | (2009.01) |
| *G05B 15/02* | (2006.01) |
| *H04N 21/4363* | (2011.01) |

(52) U.S. Cl.
CPC .............. *G06F 3/165* (2013.01); *G05B 15/02* (2013.01); *H04W 4/008* (2013.01); *H04N 21/43637* (2013.01); *H04R 2227/005* (2013.01); *H04R 2420/07* (2013.01)

(58) Field of Classification Search
CPC .......... H04R 2420/07; H04R 2227/005; H04N 21/43637; H04W 4/008
See application file for complete search history.

(56) References Cited

U.S. PATENT DOCUMENTS

| | | | | |
|---|---|---|---|---|
| 2012/0029671 | A1* | 2/2012 | Millington | ............ H04J 3/0664 700/94 |
| 2012/0058727 | A1* | 3/2012 | Cook | ...................... H04R 5/02 455/41.3 |
| 2013/0266152 | A1* | 10/2013 | Haynie | .................. H04R 5/033 381/80 |

* cited by examiner

*Primary Examiner* — Thomas Maung
(74) *Attorney, Agent, or Firm* — Rosenberg, Klein & Lee

(57) ABSTRACT

An audio synchronization method for Bluetooth speakers is disclosed. The Bluetooth speakers comprise a first Bluetooth speaker and a second Bluetooth speaker transmitting digital audio packets by Bluetooth communication. The method comprises steps of: fetching the sample counts of the first Bluetooth speaker and the second Bluetooth speaker at the first timing; and adjusting the sample rate of the second Bluetooth speaker according to the sample counts of the first Bluetooth speaker and the second Bluetooth speaker. By using the method of the present invention, the sample counts are checked periodically to keep the Bluetooth speakers audio synchronized.

17 Claims, 5 Drawing Sheets

AUDIO SYNCHRONIZATION METHOD FOR BLUETOOTH SPEAKERS

BACKGROUND OF THE INVENTION

The present invention is related to an audio synchronization method for Bluetooth speakers, which detects and adjusts a plurality of Bluetooth speakers in a predetermined time period to keep the plurality of Bluetooth speakers synchronized.

Bluetooth is a wireless technology standard for exchanging data over short distances from devices. Bluetooth is a packed-based protocol with a master-slave structure. When using Bluetooth for data transmission, one of the devices is defined as a master, and the other is defined as a slave. The master and the slave are paired to generate a bond, and a personal area networks is built. In general, a mobile phone would be a master, and a Bluetooth speaker or Bluetooth headset would be a slave. The mobile phone can transmit digital audio data to the Bluetooth speaker or Bluetooth headset to play the audio. The Bluetooth headset can also transmit digital audio data to the mobile phone.

SUMMARY OF THE PRESENT INVENTION

It is an object of the present invention to provide an audio synchronization method for Bluetooth speakers which detects and adjusts the Bluetooth speakers to keep the Bluetooth speakers audio synchronized.

It is another object of the present invention to provide an audio synchronization method for Bluetooth speakers, wherein one of the Bluetooth speakers transmits digital audio packets to other Bluetooth speakers by Bluetooth communication. By fetching and comparing the sample counts of the Bluetooth speakers, whether the Bluetooth speakers are audio synchronized is determined.

It is still another object of the present invention to provide an audio synchronization method for Bluetooth speakers which adjusts the sample rate of at least one of the Bluetooth speakers according to the sample counts of the same timing of the Bluetooth speakers to make the Bluetooth speakers audio synchronized.

It is still another object of the present invention to provide an audio synchronization method for Bluetooth speakers, wherein each packet of the digital audio packets comprises a sequence number labeling the amount of samples before the packet for preventing the sample count from error.

The present invention provides an audio synchronization method for Bluetooth speakers, wherein the Bluetooth speakers comprise a first Bluetooth speaker and a second Bluetooth speaker, the first Bluetooth speaker and the second Bluetooth speaker transmit digital audio packets by Bluetooth communication, wherein the method comprises the steps of: fetching sample counts of the first Bluetooth speaker and the second Bluetooth speaker at a first timing; and adjusting a sample rate of the second Bluetooth speaker according to the sample counts of the first Bluetooth speaker and the second Bluetooth speaker.

In one embodiment of the present invention, the method further comprises a step of comparing the sample counts of the first Bluetooth speaker and the second Bluetooth speaker of the first timing.

In one embodiment of the present invention, the first Bluetooth speaker is a master and the second Bluetooth speaker is a slave.

In one embodiment of the present invention, the method further comprises a step of fetching the sample counts of the first Bluetooth speaker and the second Bluetooth speaker at the same timing.

In one embodiment of the present invention, the method further comprises a step of synchronizing the clocks of the first Bluetooth speaker and the second Bluetooth speaker.

In one embodiment of the present invention, the method further comprises a step of pairing the second Bluetooth speaker with the first Bluetooth speaker, such that the first Bluetooth speaker and the second Bluetooth speaker use the same clock.

In one embodiment of the present invention, the method further comprises a step of defining the first timing according to the clock.

In one embodiment of the present invention, each of the first Bluetooth speaker and the second Bluetooth speaker comprises: a buffer for temporarily storing the digital audio packets; a decoder connected to the buffer for decoding samples of the digital audio packets; a sample rate adjusting unit connected to the decoder for adjusting the sample rate; and a DAC connected to the sample rate adjusting unit for converting the samples to an analog audio signal.

In one embodiment of the present invention, the method further comprises steps of: fetching the sample counts of the first Bluetooth speaker and the second Bluetooth speaker at the first timing; and adjusting the sample rate of the second Bluetooth speaker according to the sample counts of the first Bluetooth speaker and the second Bluetooth speaker of the first timing.

In one embodiment of the present invention, the method further comprises a step of comparing the sample counts of the first Bluetooth speaker and the second Bluetooth speaker of the first timing.

In one embodiment of the present invention, the digital audio packets comprises a plurality of packets, each packet comprises a sequence number for labeling an amount of the samples before the packet.

The present invention further provides an audio synchronization method for Bluetooth speakers, wherein the Bluetooth speakers comprise a first Bluetooth speaker and a second Bluetooth speaker, the first Bluetooth speaker and the second Bluetooth speaker transmit digital audio packets by Bluetooth communication, wherein the method comprises steps of: fetching a first sample count of the first Bluetooth speaker at a first timing; transmitting the first timing and the first sample count to the second Bluetooth speaker; fetching a second sample count of the second Bluetooth speaker of the first timing; and adjusting a sample rate of the second Bluetooth speaker according to the first sample count and the second sample count.

In one embodiment of the present invention, the method further comprises a step of comparing the first sample count and the second sample count.

In one embodiment of the present invention, the method further comprises a step of synchronizing clocks of the first Bluetooth speaker and the second Bluetooth speaker.

In one embodiment of the present invention, the method further comprises a step of defining the first timing according to the clock.

In one embodiment of the present invention, the digital audio packets comprise a plurality of packets, each packet comprises a sequence number labeling an amount of samples before the packet.

DETAILED DESCRIPTION OF THE PREFERRED EMBODIMENTS

Figure 1:
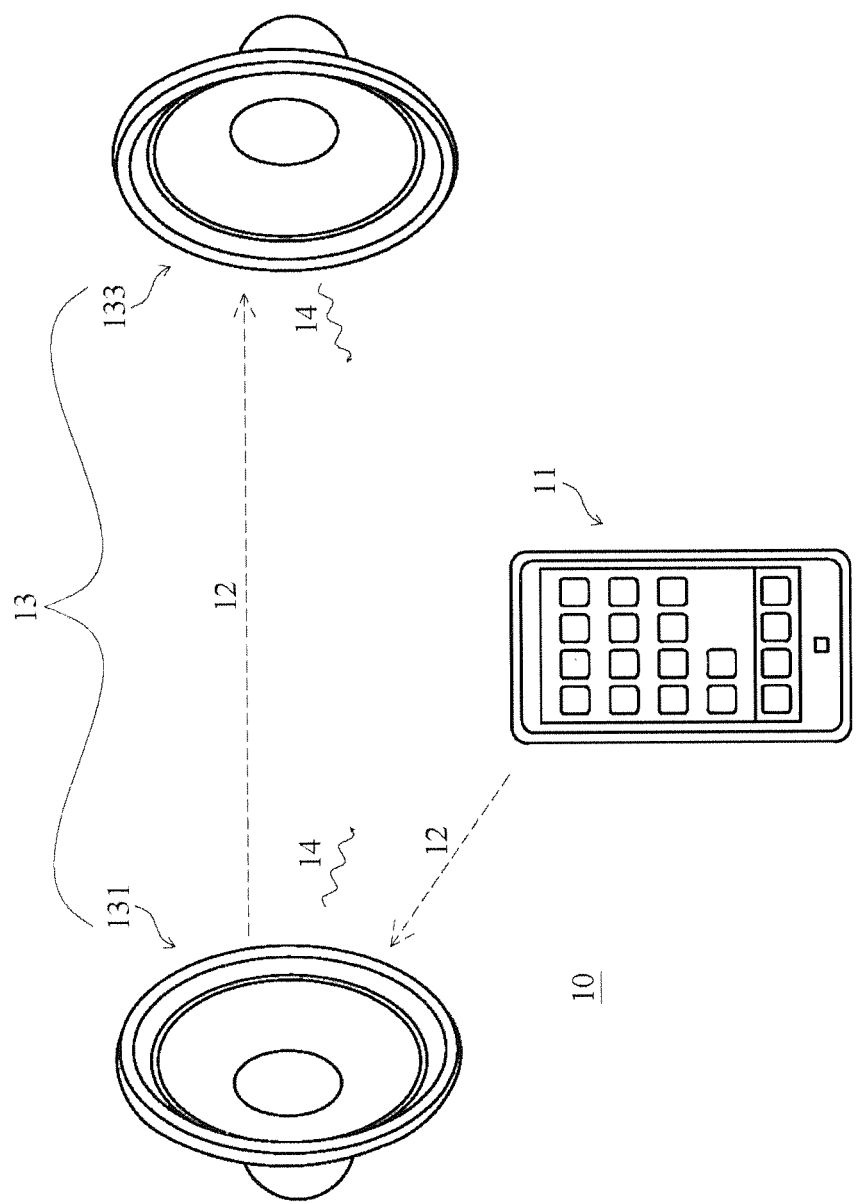
FIG. 1 is a schematic diagram showing structure of the data transmission system in accordance with one embodiment of the present invention.
Figure 2:
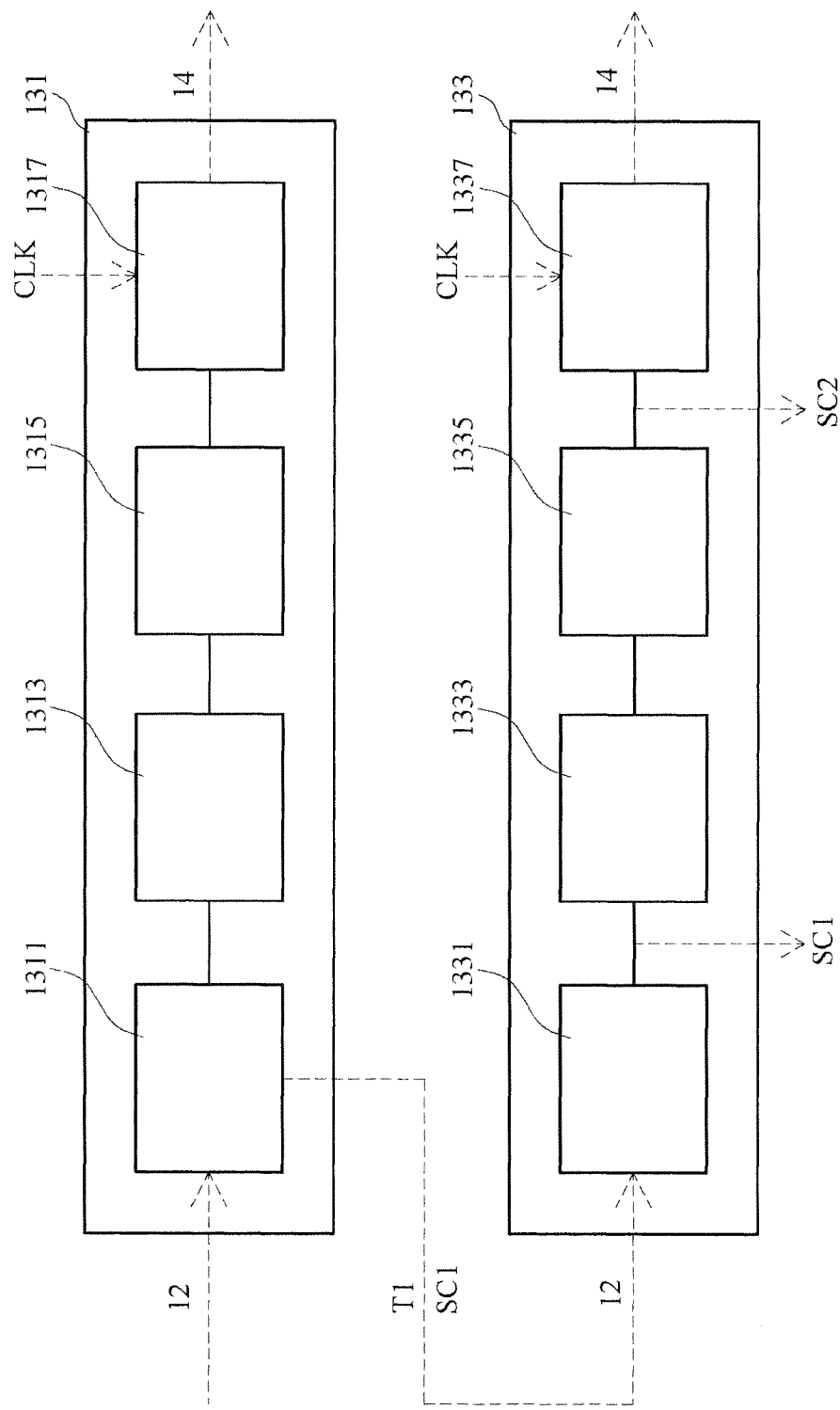
FIG. 2 is a schematic diagram showing the structure of the Bluetooth speaker in accordance with one embodiment of the present invention.

Please refer to FIGS. 1 and 2, there are shown a data transmission system 10 in accordance with one embodiment of the present invention and the structure of the Bluetooth speakers in accordance with one embodiment of the present invention. In one embodiment of the present invention, the data transmission system 10 comprises an electronic device 11 and a plurality of Bluetooth speakers 13, wherein the electronic device 11 is not necessary in the present invention. In the present embodiment, the plurality of Bluetooth speakers 13 comprise a first Bluetooth speaker 131 and a second Bluetooth speaker 133. The first Bluetooth speaker 131 and the second Bluetooth speaker 133 can be paired and transmit digital audio packet to each other by Bluetooth. In another embodiment of the present invention, the amount of the Bluetooth speakers can be more than 2 and the plurality of Bluetooth speakers can be synchronized by the using the audio synchronization method for Bluetooth speakers of the present invention.

In one embodiment of the present invention, the first Bluetooth speaker 131 and the second Bluetooth speaker 133 are combined to form a speaker system, wherein the first Bluetooth speaker 131 is the left channel speaker and the second Bluetooth speaker 133 is the right channel speaker. For two-channel speaker system, the first Bluetooth speaker 131 and the second Bluetooth speaker 133 should be well synchronized to perform hi-fi sound effect. For the same reason, in a multi-channel speaker system with more than two Bluetooth speakers, the Bluetooth speakers should be well synchronized, too.

In one embodiment of the present invention, digital audio packets 12 are stored in the electronic device 11. The electronic device 11 transmits the digital audio packets 12 to the first Bluetooth speaker 131 by Bluetooth, and then the first Bluetooth speaker 131 transmits the digital audio packets 12 to the second Bluetooth speaker 133. The electronic device 11 is not the necessary element in the present invention. The present invention is mainly applied to a plurality of Bluetooth speakers 13 for synchronizing the plurality of Bluetooth speakers. The digital audio packets 12 can also be stored in the first Bluetooth speaker 131, and the first Bluetooth speaker 131 transmits the digital audio packets 12 to the second Bluetooth speaker 133 by Bluetooth.

In one embodiment of the present invention, the first Bluetooth speaker 131 is defined as the master; the second Bluetooth speaker 133 is defined as the slave. Before the first Bluetooth speaker 131 transmits the digital audio packets 12 to the second Bluetooth speaker 133, the Bluetooth connection between the first Bluetooth speaker 131 and the second Bluetooth speaker 133 should be established first.

Firstly, the first Bluetooth speaker 131 and the second Bluetooth speaker 133 should be paired to synchronize the clocks of the first Bluetooth speaker 131 and the second Bluetooth speaker 133. During the pairing process, the first Bluetooth speaker 131 performs an inquiry to search for nearby devices, and the second Bluetooth speaker 133 responds to the inquiry if the second Bluetooth speaker 133 is in the communication range of the first Bluetooth speaker 131. The packet that the second Bluetooth speaker 133 responds to the inquiry comprises the Bluetooth address (BD_ADDR) of the second Bluetooth speaker 133.

After receiving the response from the second Bluetooth speaker 133, the first Bluetooth speaker 131 sends out a page packet according to the Bluetooth address of the second Bluetooth speaker 133. Since the page packet comprises the Bluetooth address of the second Bluetooth speaker 133, only the second Bluetooth speaker 133 can receive the page packet from the first Bluetooth speaker 131.

The second Bluetooth speaker 133 receives the page packet and obtains the clock of the first Bluetooth speaker 131 from the contents of the page packet. Then the second Bluetooth speaker 133 and the first Bluetooth speaker 131 are synchronized and use the same clock. By the aforementioned processes, the Bluetooth connection between the first Bluetooth speaker 131 and the second Bluetooth speaker 133 is established. The first Bluetooth speaker 131 and the second Bluetooth speaker 133 can transmit digital audio packets 12 to each other by Bluetooth.

In one embodiment of the present invention, the digital audio packets 12 are transmitted from the electronic device 11 to the first Bluetooth speaker 131. Then the first Bluetooth speaker 131 transmits the received digital audio packets 12 to the second Bluetooth speaker 133. The first Bluetooth speaker 131 and the second Bluetooth speaker 133 do not receive the digital audio packets 12 at the same time. The first Bluetooth speaker 131 will not convert and play the digital audio packets 12 right after receiving them. After confirming the second Bluetooth speaker 133 has received the digital audio packets 12, the first Bluetooth speaker 131 and the second Bluetooth speaker 133 convert and play the digital audio packets 12 at the same time for synchronizing the audio signal at the beginning.

As shown in FIG. 2, each of the first Bluetooth speaker 131 and the second Bluetooth speaker 133 comprises a buffer 1311/1331, a decoder 1313/1333, a sample rate adjusting unit 1315/1335, and a DAC 1317/1337 respectively. The decoder 1313/1333 is connected to the buffer 1311/1331; the sample rate adjusting unit 1315/1335 is connected to the decoder 1313/1333 and the DAC 1317/1337.

In actual applications, the first Bluetooth speaker 131 and the second Bluetooth speaker 133 may comprise Bluetooth transmission interface, speaker, amplifier, microprocessor, and power supply for the operation of the first Bluetooth speaker 131 and the second Bluetooth speaker 133. Since these elements are not related to the present invention and have been described in the prior art, they are not shown in FIG. 2.

In the present invention, the buffer 1311/1331 is used to temporarily store the digital audio packets 12. The decoder 1313/1333 is used to decode the sample of the digital audio packets 12. The sample rate adjusting unit 1315/1335 is used to adjust the sample rate of the first/second Bluetooth speaker 131/133. The DAC 1317/1337 is used to convert the sample of the digital audio packets 12 to analog audio signal 14. In the present invention, the sample rate is defined as the amount of the samples that are converted into analog audio signal per unit of time.

After receiving the digital audio packets 12, the first Bluetooth speaker 131 temporarily stores the digital audio packets 12 in the buffer 1311 and transmits the digital audio packets 12 to the second Bluetooth speaker 133 by Bluetooth.

After receiving the digital audio packets 12 from the first Bluetooth speaker 131, the second Bluetooth speaker 133 temporarily stores the digital audio packets 12 in the buffer 1331, too. After the first Bluetooth speaker 131 and the second Bluetooth speaker 133 have both received the digital audio packets 12, they can convert and play the digital audio packets 12 in the same time. Since the first Bluetooth speaker 131 and the second Bluetooth speaker 133 use the same clock, they can be configured to process the digital audio packets 12 in the same time.

The digital audio packets 12 comprises a plurality of samples. The plurality of samples of the digital audio packets 12 are transmitted to the decoder 1313/1333 of the first/second Bluetooth speaker 131/133 for decoding. The decoded samples are transmitted to the DAC 1317/1337 by the sample rate adjusting unit 1315/1335 and converted to analog audio signal 14 by the DAC 1317/1337. Then the first Bluetooth speaker 131 and the second Bluetooth speaker 133 can play the analog audio signal 14 synchronously.

The first Bluetooth speaker 131 and the second Bluetooth speaker 133 may have different processing speed in processing the digital audio packets 12. That will break the audio synchronization of the first Bluetooth speaker 131 and the second Bluetooth speaker 133 in playing the analog audio signal 14 and degrade the hi-fi performance of the first Bluetooth speaker 131 and the second Bluetooth speaker 133.

Figure 3:
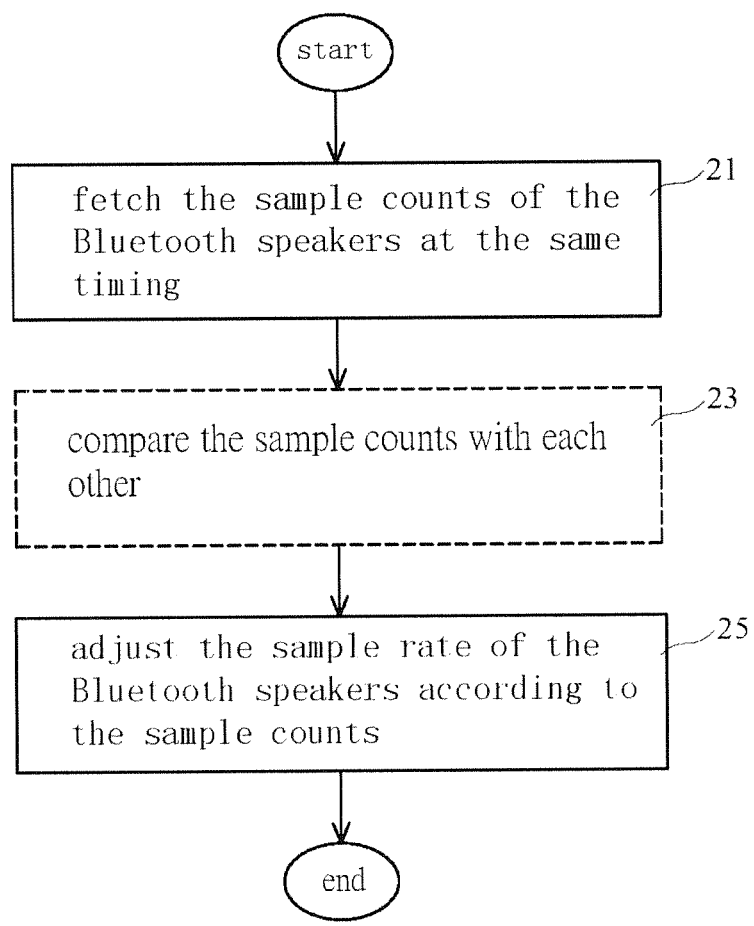
FIG. 3 is a flow chart illustrating an audio synchronization method for Bluetooth speakers in accordance with one embodiment of the present invention.

FIG. 3 is a flow chart that illustrates an audio synchronization method for Bluetooth speakers in accordance with one embodiment of the present invention. Please also refer to FIG. 1 and FIG. 2. In the present invention, the amount of the samples that have been converted to analog audio signal is defined as sample count. In the method of the present invention, the sample count of each of the plurality of Bluetooth speakers 13 at the same timing is fetched firstly, as shown in step 21. For example, the sample count, the amount of the samples that have been converted to analog audio signal by the DAC 1317/1337 of the first/second Bluetooth speaker 131/133, at a first timing can be fetched respectively. In the present invention, the sample count of the same timing of each Bluetooth speaker 13 is fetched respectively, but it is not necessary to fetch the sample count at the same time.

And then, the sample counts of the same timing of the plurality of Bluetooth speakers 13 are compared with each other, as shown in step 23. For example, the sample counts of the first Bluetooth speaker 131 and the second Bluetooth speaker 133 at the first timing are compared with each other. If the sample count of the first Bluetooth speaker 131 at the first timing is different from the sample count of the second Bluetooth speaker 133 at the first timing, the first Bluetooth speaker 131 and the second Bluetooth speaker 133 are not audio synchronized.

In step 25, the sample rate of at least one of the plurality of Bluetooth speakers 13 is adjusted according to the comparison of the sample counts of the same timing. For example, if the sample counts of the first timing of the first Bluetooth speaker 131 and the second Bluetooth speaker 133 are different, the first Bluetooth speaker 131 and the second Bluetooth speaker 133 are not synchronized. By adjusting the sample rate of the first Bluetooth speaker 131 or/and the second Bluetooth speaker 133, the first Bluetooth speaker 131 and the second Bluetooth speaker 133 can be audio synchronized.

In one embodiment of the present invention, the first Bluetooth speaker 131 is a master and the second Bluetooth speaker 133 is a slave. According to the comparison of the sample counts of the first timing of the first Bluetooth speaker 131 and the second Bluetooth speaker 133, the sample rate of the second Bluetooth speaker 133 is adjusted to make the sample counts of the first Bluetooth speaker 131 and the second Bluetooth speaker 133 the same at the same timing, such that the first Bluetooth speaker 131 and the second Bluetooth speaker 133 are audio synchronized. In another embodiment of the present invention, it is possible to adjust the sample rate of the first Bluetooth speaker 131 or to adjust the sample rate of both first Bluetooth speaker 131 and the second Bluetooth speaker 133 to make the first Bluetooth speaker 131 and the second Bluetooth speaker 133 audio synchronized.

In one embodiment of the present invention, the above-mentioned step 23 can be omitted. The sample rates of the plurality of Bluetooth speakers 13 are adjusted according to the sample counts of the plurality of Bluetooth speakers 13 respectively for audio synchronization.

Before step 21, the clocks of the first Bluetooth speaker 131 and the second Bluetooth speaker 133 are synchronized, as shown in FIG. 1 and FIG. 2. Since the first Bluetooth speaker 131 and the second Bluetooth speaker 133 use the same clock, the first timing can be defined, and the sample counts of the first Bluetooth speaker 131 and the second Bluetooth speaker 133 at the first timing can be fetched.

Figure 4:
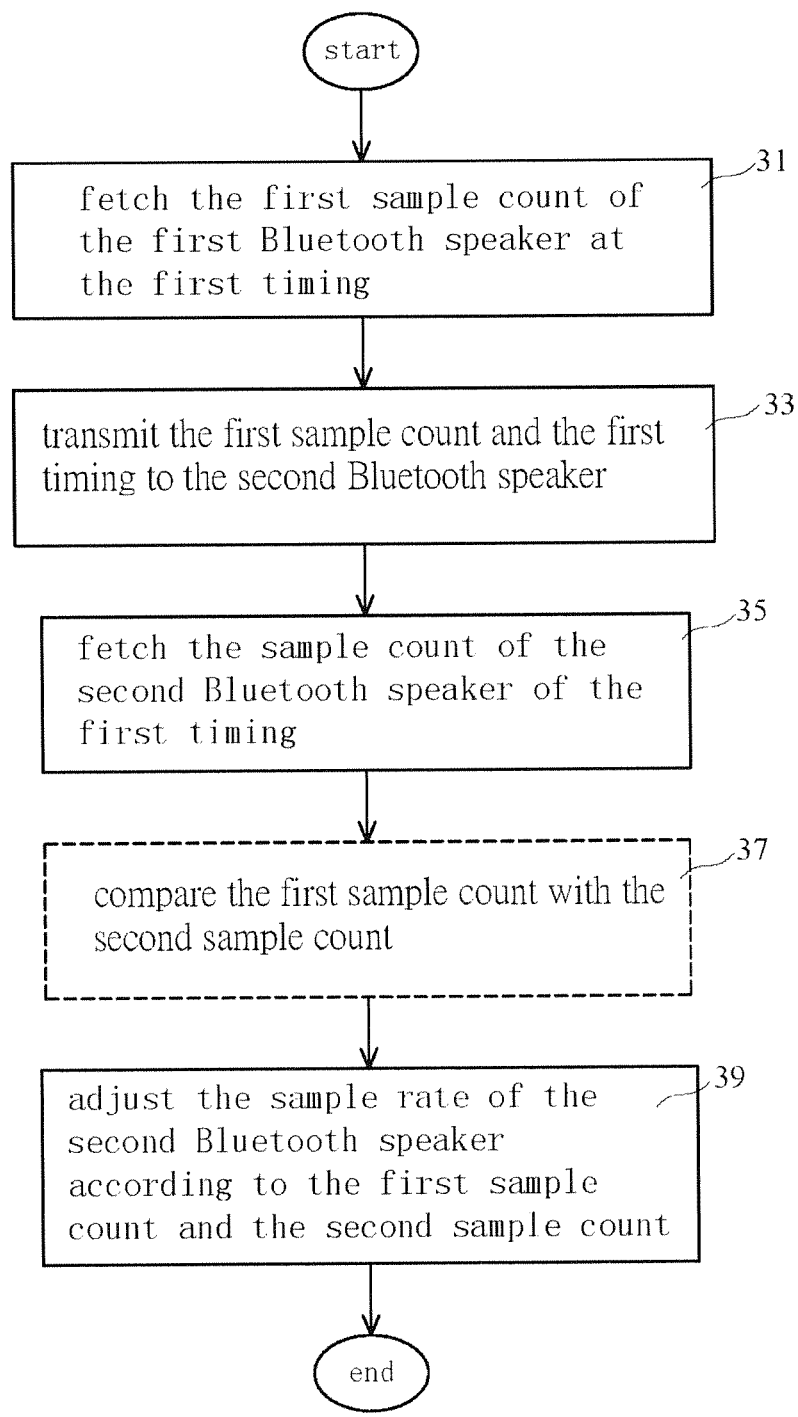
FIG. 4 is a flow chart illustrating an audio synchronization method for Bluetooth speakers in accordance with another embodiment of the present invention.

FIG. 4 is a flow chart that illustrates an audio synchronization method for Bluetooth speakers in accordance with another embodiment of the present invention. Please also refer to FIG. 1 and FIG. 2. In the present embodiment, the method of the present invention is illustrated by the first Bluetooth speaker 131 and the second Bluetooth speaker 133, but the amount of the Bluetooth speakers is not the limitation of the present invention. In actual applications, the method of the present invention can be used for more than two Bluetooth speakers.

In one embodiment of the present invention, the first Bluetooth speaker 131 is a master, and the second Bluetooth speaker 133 is a slave. The first Bluetooth speaker 131 and the second Bluetooth speaker 133 are paired and bonded by Bluetooth connection, such that the clocks of the first Bluetooth speaker 131 and the second Bluetooth speaker 133 are synchronized.

In the method of the present embodiment, the first sample count SC1 of the first Bluetooth speaker 131 at the first timing T1 is fetched, as shown in step 31. The first Bluetooth speaker 131 transmits the first timing T1 and the first sample count SC1 to the second Bluetooth speaker 133, as shown in step 33.

After receiving the first timing T1 and the first sample count SC1, the second Bluetooth speaker 133 fetches the second sample count SC2 of the second Bluetooth speaker 133 of the first timing T1, as shown in step 35. And then, the first sample count SC1 and the second sample count SC2 of the first timing are compared with each other, as shown in step 37.

According to the first sample count SC1 and the second sample count SC2 or the comparison of the first sample count SC1 and the second sample count SC2, whether the first Bluetooth speaker 131 and the second Bluetooth speaker 133 are audio synchronized can be determined. If the first Bluetooth speaker 131 and the second Bluetooth speaker 133 are not audio synchronized, the sample rate of the second Bluetooth speaker 133 can be adjusted by controlling the sample rate adjusting unit 1335 to make the first Bluetooth speaker 131 and the second Bluetooth speaker 133 audio synchronized, as shown in step 39.

In one embodiment of the present invention, the aforementioned step 37 can be omitted, the sample rate of each of the plurality of Bluetooth speakers 13 can be adjusted according to the sample count of the first Bluetooth speaker 131 to make the plurality of Bluetooth speakers 13 audio synchronized.

In the aforementioned embodiments, since the clock of the plurality of Bluetooth speakers 13 are synchronized during the pairing process, the same timing or the first timing can be defined according to the same clock.

For example, each of the plurality of Bluetooth speakers 13 is configured to fetch the sample count when the clock is counted 100 or the multiple of 100. And then, the sample rate of one or more of the plurality of Bluetooth speakers 13 is adjusted according to the sample count or the comparison of the sample counts. The plurality of Bluetooth speakers 13 can be adjusted periodically to keep them audio synchronized.

Figure 5:
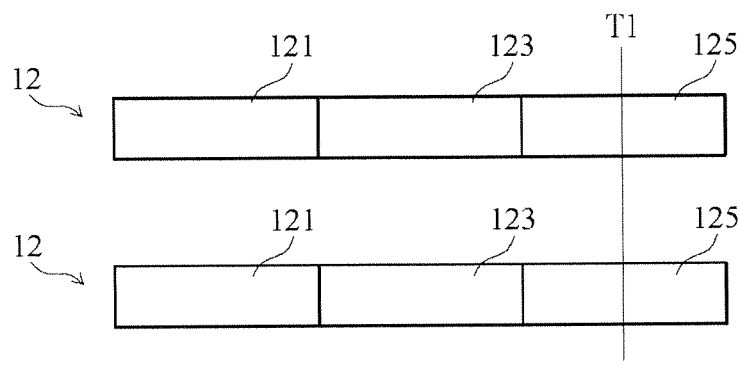
FIG. 5 is a schematic diagram showing the digital audio packets in accordance with one embodiment of the present invention.
Figure 6:
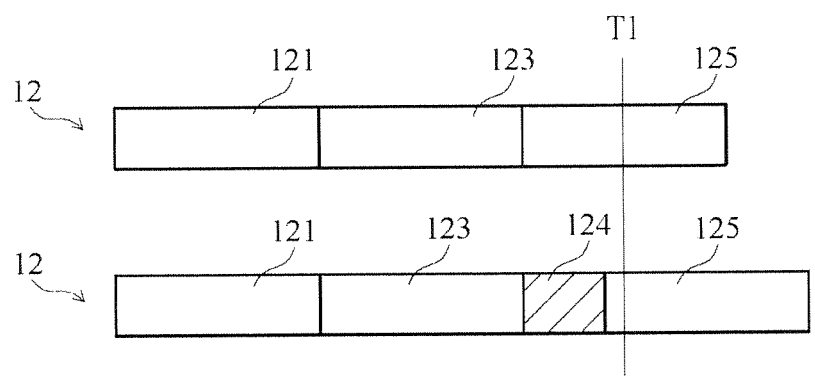
FIG. 6 is a schematic diagram showing the digital audio packets in accordance with another embodiment of the present invention.
Figure 7:
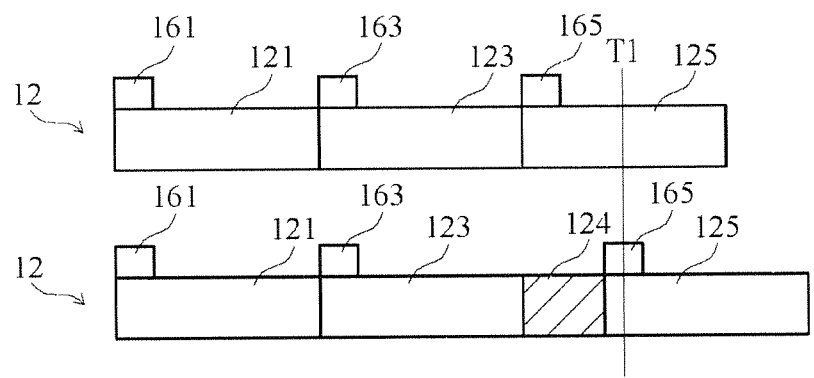
FIG. 7 is a schematic diagram showing the digital audio packets in accordance with still another embodiment of the present invention.

In the following embodiments, the digital audio packets 12 and the samples are quantified for illustration, as shown in FIG. 5-7. The quantities are only examples for illustration; they are not limitations in the present invention.

Referring to FIG. 5, there is shown a schematic diagram of the digital audio packets 12 in accordance with one embodiment of the present invention. The first Bluetooth speaker 131 and the second Bluetooth speaker 133 receive the digital audio packets 12 and convert the digital audio packets 12 into analog audio signal. Assume that the digital audio packets 12 comprise a first packet 121, a second packet 123, and a third packet 125; and each packet 121/123/125 comprises 100 samples. If the first Bluetooth speaker 131 has converted the first packet 121, the second packet 123, and a part of the third packet 125, such as 50 samples of the third packet 125, to analog audio signal at the first timing T1, the sample count of the first Bluetooth speaker 131 at the first timing T1 is 250.

In ideal situation, the digital audio packets 12 that the first Bluetooth speaker 131 and the second Bluetooth speaker 133 convert to analog audio signal are the same, and the sample counts of the first Bluetooth speaker 131 and the second Bluetooth speaker 133 at the first timing T1 should be the same, too. In other words, if the second Bluetooth speaker 133 is audio synchronized with the first Bluetooth speaker 131, the sample count of the second Bluetooth speaker 133 at the first timing T1 should be 250.

If the sample count of the second Bluetooth speaker 133 at the first timing T1 is greater than 250, the sample rate of the second Bluetooth speaker 133 is too high. The sample rate of the second Bluetooth speaker 133 should be lowered to make the second Bluetooth speaker 133 audio synchronized with the first Bluetooth speaker 131.

On the contrary, if the sample count of the second Bluetooth speaker 133 at the first timing T1 is smaller than 250, the sample rate of the second Bluetooth speaker 133 is too low and should be raised. For example, the sample rate of the second Bluetooth speaker 133 can be raised by controlling the sample rate adjusting unit 1335.

In the aforementioned embodiments, the sample rate of each of the plurality of Bluetooth speakers 13 is adjusted according to the sample counts or the comparison of the sample counts of the plurality of Bluetooth speakers 13. In general, the aforementioned methods work well when the plurality of Bluetooth speakers 13 are in good communication conditions.

If the plurality of Bluetooth speakers 13 are not in good communication condition, the transmitted digital audio packets 12 may be lost or delayed. Then, the audio synchronization of the plurality of Bluetooth speakers 13 can not be determined by the sample counts of the plurality of Bluetooth speakers 13.

Referring to FIG. 6, there is shown a schematic diagram of the digital audio packets 12 in accordance with another embodiment of the present invention. When the first Bluetooth speaker 131 and the second Bluetooth speaker 133 are not in good communication condition, the time when the second Bluetooth speaker 133 receives the third packet 125 may be delayed. When the packet incoming is delayed, the second Bluetooth speaker 133 will fill in a blank packet 124 for the delay time. For the situation, the sample count of the second Bluetooth speaker 133 at the first timing T1 comprises the blank packet 124. This causes that the amount of samples that have been actually converted to analog audio signal by the first Bluetooth speaker 131 and the second Bluetooth speaker 133 are not the same at the first timing T1. The audio synchronization of the first Bluetooth speaker 131 and the second Bluetooth speaker 133 can not be determined by the sample counts of the first Bluetooth speaker 131 and the second Bluetooth speaker 133.

Assume that each of the first packet 121, the second packet 123, and the third packet 125 comprises 100 samples respectively; and the blank packet 124 comprises 40 samples. If the sample count of the first Bluetooth speaker 131 and the second Bluetooth speaker 133 at the first timing T1 are both 250, the first Bluetooth speaker 131 and the second Bluetooth speaker 133 should be audio synchronized in ideal case. But, the sample count of the second Bluetooth speaker 133 comprises 40 blank samples of the blank packet 124; the amount of samples that the second Bluetooth speaker 133 actually converts to analog audio signal is 210. In other words, when the first Bluetooth speaker 131 and the second Bluetooth speaker 133 are not in good communication condition or the sample counts comprise an error, such as the sample count of the second Bluetooth speaker 133 comprises blank samples of the blank packet 124, the method of the present invention would go out of order.

To overcome the problem, a sequence number is introduced to the packet of the digital audio packets 12 of the present invention. The sequence number labels the amount of samples before the packet. For example, the first packet 121, the second packet 123, and the third packet 125 comprise a first sequence number 161, a second sequence number 163, and a third sequence number 165, respectively. The first sequence number 161, the second sequence number 163, and the third sequence number 165 label the amount of samples before the first packet 121, the second packet 123, and the third packet 125, respectively.

Referring to FIG. 7, there is shown a schematic diagram of the digital audio packets 12 in accordance with still another embodiment of the present invention. Assume that each of the first packet 121, the second packet 123, and the third packet 125 comprises 100 samples, respectively. Since there is no sample before the first packet 121, the first sequence number 161 is 0. There are 100 samples before the second packet 123 that the second sequence number 163 is 100. The third sequence number 165 is 200, since there are 200 samples before the third packet 125. When fetching the sample count of the second Bluetooth speaker 133 at the first timing T1, the blank samples of the blank packet 124 will not be counted, since the third sequence number 165 of the third packet 125 labels 200.

The sequence number of the present invention is used to denote the amount of the samples that has been processed. How to label the amount of the samples in the sequence number is not the limitation of the present invention.

Although particular embodiments of the invention have been described in detail for purposes of illustration, various modifications and enhancements may be made without departing from the scope of the invention specified by the claims.

What is claimed is:

1. An audio synchronization method for Bluetooth speakers, wherein the Bluetooth speakers include a first Bluetooth speaker and a second Bluetooth speaker, the first Bluetooth speaker and the second Bluetooth speaker establishing an exclusive Bluetooth connection therebetween for transmission of digital audio packets by Bluetooth communication, each digital audio packet including a plurality of digital audio samples, wherein the method comprises:
    fetching sample counts for the first Bluetooth speaker and the second Bluetooth speaker at a first time reference, each sample count indicating a number of the digital audio samples actually processed by one of the first and second Bluetooth speakers; and
    adjusting a sample rate of the second Bluetooth speaker according to respective sample counts of the first Bluetooth speaker and the second Bluetooth speaker;
    wherein the digital audio packets transmitted from the first Bluetooth speaker to the second Bluetooth speaker are disposed in a continuous sequence, at least one of the digital audio packets including a sequence number identifying a total expected count of samples to be processed to audio signal form by the second Bluetooth speaker in one or more preceding packets of the continuous sequence;
    the method further comprising selectively adjusting the sample count of the second Bluetooth speaker responsive to inconsistency between said sample count of the second Bluetooth speaker and the sequence number of a digital audio packet processed by the second Bluetooth speaker at a time reference corresponding thereto, whereby erroneous digital audio packets are excluded from the adjusted sample count used in adjusting the sample rate for at least the second Bluetooth speaker,
    the first and second Bluetooth speakers being thereby maintained in audio synchronization despite mismatch between sample count and sequence number of a digital audio packet.

2. The method as claimed in claim 1, further comprising comparing the relative sample counts of the first Bluetooth speaker and the second Bluetooth speaker of the first time reference.

3. The method as claimed in claim 1, wherein the first Bluetooth speaker is a master and the second Bluetooth speaker is a slave.

4. The method as claimed in claim 1, wherein the sample counts of the first Bluetooth speaker and the second Bluetooth speaker are fetched at the same time reference.

5. The method as claimed in claim 1, further comprising synchronizing a clock of the first Bluetooth speaker with a clock of the second Bluetooth speaker.

6. The method as claimed in claim 5, further comprising pairing the second Bluetooth speaker with the first Bluetooth speaker, such that the first Bluetooth speaker and the second Bluetooth speaker use the same clock upon synchronization.

7. The method as claimed in claim 6, further comprising defining the first time reference according to the synchronized clocks.

8. The method as claimed in claim 1, wherein each of the first Bluetooth speaker and the second Bluetooth speaker includes:
    a buffer for temporarily storing the digital audio packets;
    a decoder connected to the buffer for decoding samples of the digital audio packets;
    a sample rate adjusting unit connected to the decoder for adjusting the sample rate; and
    a digital-to-analog converter (DAC) connected to the sample rate adjusting unit for converting the samples to an analog audio signal.

9. The method as claimed in claim 8, further comprising comparing the sample counts of the first Bluetooth speaker and the second Bluetooth speaker of the first time reference.

10. An audio synchronization method for Bluetooth speakers, wherein the Bluetooth speakers include a first Bluetooth speaker and a second Bluetooth speaker, the first Bluetooth speaker and the second Bluetooth speaker establishing an exclusive Bluetooth connection therebetween for transmission of a continuous sequence of a plurality of digital audio packets by Bluetooth communication, each digital audio packet including a plurality of digital audio samples, wherein the method comprises:
    fetching a first sample count, said first sample count indicating a number of the digital audio samples actually processed by the first Bluetooth speaker at a first time reference;
    transmitting the first time reference and transmitting the first sample count to the second Bluetooth speaker;
    fetching a second sample count, said second sample count indicating a number of the digital audio samples actually processed by the second Bluetooth speaker at the first time reference; and
    adjusting a sample rate of the second Bluetooth speaker according to respective sample counts of the first Bluetooth speaker and the second Bluetooth speaker;
    wherein the digital audio packets transmitted from the first Bluetooth speaker to the second Bluetooth speaker are disposed in a continuous sequence, at least one of the digital audio packets including a sequence number identifying a total expected count of samples to be processed to audio signal form by the second Bluetooth speaker in one or more preceding packets of the continuous sequence;
    the method further comprising selectively adjusting the sample count of the second Bluetooth speaker responsive to inconsistency between said sample count of the second Bluetooth speaker and the sequence number of a digital audio packet processed by the second Bluetooth speaker at a time reference corresponding thereto, whereby erroneous digital audio packets are excluded from the adjusted sample count used in adjusting the sample rate for at least the second Bluetooth speaker,
    the first and second Bluetooth speakers being thereby maintained in audio synchronization despite mismatch between sample count and sequence number of a digital audio packet.

11. The method as claimed in claim 10, further comprising comparing the first sample count and the second sample count.

12. The method as claimed in claim 10, further comprising synchronizing a clock of the first Bluetooth speaker with a clock of the second Bluetooth speaker.

13. The method as claimed in claim 12, further comprising defining the first time reference according to the synchronized clocks.

14. An audio-synchronized Bluetooth speaker system comprising a first Bluetooth speaker and a second Bluetooth speaker, the first Bluetooth speaker and the second Bluetooth speaker establishing an exclusive Bluetooth connection therebetween for transmission of digital audio packets by Bluetooth communication, each digital audio packet including a plurality of digital audio samples,
  wherein at least one of the Bluetooth speakers includes a sample rate adjusting unit for adjusting the sample rate, a sample rate adjusting unit of the second Bluetooth speaker configured to adjust a sample rate of the second Bluetooth speaker according to respective sample counts of the first Bluetooth speaker and the second Bluetooth speaker as fetched at a first time reference, each sample count indicating a number of the digital audio samples actually processed by one of the first and second Bluetooth speakers, and
  wherein the digital audio packets transmitted from the first Bluetooth speaker to the second Bluetooth speaker are disposed in a continuous sequence, at least one of the digital audio packets including a sequence number identifying a total expected count of samples to be processed to audio signal form by the second Bluetooth speaker in one or more preceding packets of the continuous sequence, the sample count of the second Bluetooth speaker being selectively adjusted responsive to inconsistency between said sample count of the second Bluetooth speaker and the sequence number of a digital audio packet processed by the second Bluetooth speaker at a time reference corresponding thereto, whereby erroneous digital audio packets are excluded from the adjusted sample count used in adjusting the sample rate for at least the second Bluetooth speaker,
  the first and second Bluetooth speakers being thereby maintained in audio synchronization despite mismatch between sample count and sequence number of a digital audio packet.

15. The Bluetooth speaker system as claimed in claim 14, wherein each of the first Bluetooth speaker and the second Bluetooth speaker includes:
  a buffer for temporarily storing the digital audio packets;
  a decoder connected to the buffer for decoding samples of the digital audio packets;
  the sample rate adjusting unit connected to the decoder; and
  a digital-to-analog converter (DAC) connected to the sample rate adjusting unit for converting the samples to an analog audio signal.

16. The Bluetooth speaker system as claimed in claim 14, wherein the first Bluetooth speaker is a master and the second Bluetooth speaker is a slave.

17. The Bluetooth speaker system as claimed in claim 14, wherein the first Bluetooth speaker and the second Bluetooth speaker are configured to be paired and to use the same clock upon synchronization.

\* \* \* \* \*